United States Patent [19]

Miyata

[11] Patent Number: 4,470,345
[45] Date of Patent: Sep. 11, 1984

[54] APPARATUS FOR PEELING SKINS OFF THE BULBS OF ONIONS

[76] Inventor: Hiroyuki Miyata, 15-5, Honcho 5-chome, Hoya-shi, Tokyo, Japan

[21] Appl. No.: 488,801

[22] Filed: Apr. 26, 1983

[51] Int. Cl.³ .............................................. A23N 15/08
[52] U.S. Cl. ........................................ 99/516; 83/876; 83/884; 99/540; 99/584; 99/593
[58] Field of Search ................... 99/495, 509, 510, 516, 99/534, 536, 540, 584, 589, 635, 636, 643, 552, 553, 549, 564, 625, 628; 426/482, 483; 83/866, 867, 870, 872–873, 875–877, 883, 884, 886, 887

[56] References Cited

U.S. PATENT DOCUMENTS 3,696,848 10/1972 Mellon et al. ........................... 99/516
3,954,032 5/1976 Holbrook ............................ 99/509 X

FOREIGN PATENT DOCUMENTS 7906250 8/1979 Netherlands ........................ 99/584

Primary Examiner—Timothy F. Simone
Attorney, Agent, or Firm—Spencer & Frank

[57] ABSTRACT

Apparatus for peeling onion skins from the bulbs of onions comprising conveyor means for transporting the onion bulbs from a supply thereof and a roller conveyor including a plurality of rotatable cutters. The onion bulbs are supplied by the conveyor means to the roller conveyor with a flatwise planar orientation which prevents piling of the onion bulbs on one another. The rotatable cutters slit the skins of the onion bulbs, while simultaneously compressed air is blown onto the surface of the onion bulbs by the discharge parts of air nozzles coupled to a source of compressed air. Means are provided for swinging the discharge parts of the nozzles so that the air impinges on the width of the rotatable cutters.

3 Claims, 7 Drawing Figures

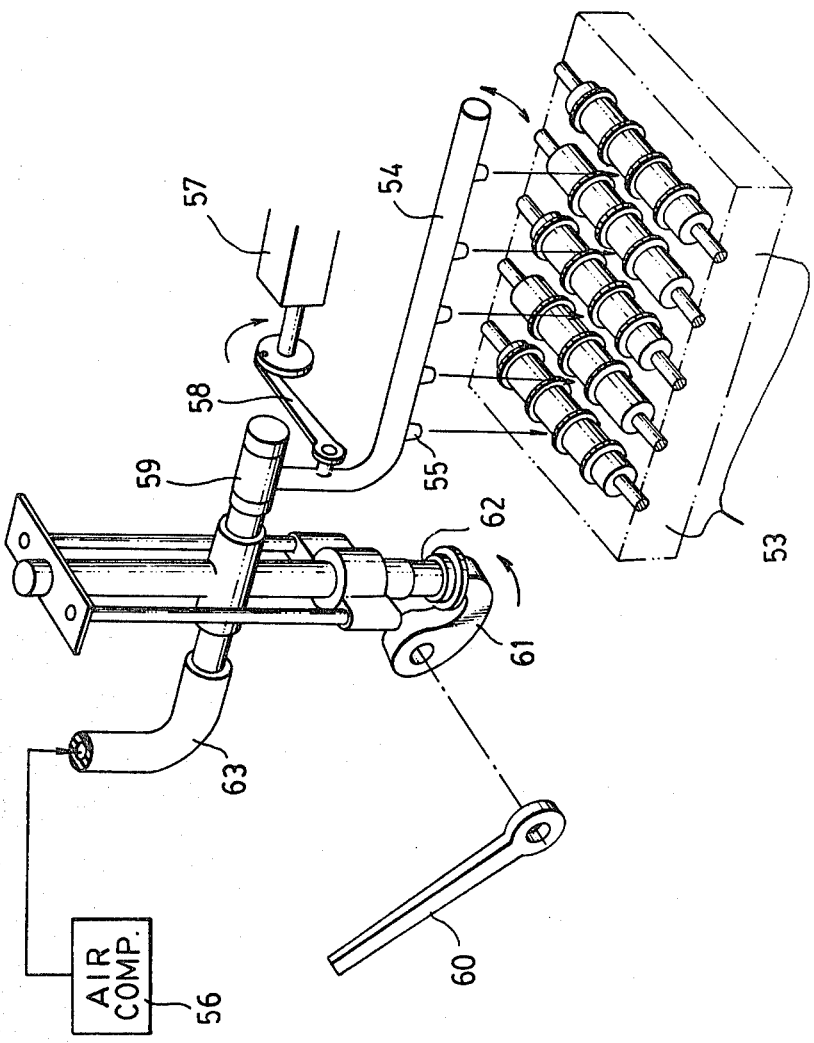

APPARATUS FOR PEELING SKINS OFF THE BULBS OF ONIONS

BACKGROUND AND SUMMARY OF THE INVENTION

The present invention relates to a method for continuously peeling onion skins off the bulbs of onions and apparatus for carrying out the method.

An onion (*Allium cepa*) is a vegetable belonging to the family of Liliaceae and its bulb is used for food.

There have been needs for peeling onion skins off a number of onion bulbs within a short time. However, conventional mechanical methods have not been successful. Therefore the task of peeling has been carved out by the hands of workers.

In order to successfully solve the problem, a method has been proposed in the inventor's copending U.S. patent application Ser. No. 06/371,473 filed on Apr. 23, 1982 for burning onion skins by the flames of gas burners and then washing with a shower of water the burned to ashes or carbonated skins off the onion bulbs. The copending application also discloses apparatus for carrying out the method. The proposed method is suitable for business or commercial use, for example, in a cooking factory where a large quantity of worked onions are cooked within a short period of time. However, for domestic or home use only small units of worked onions are sold, and it takes considerable time for transportation, charge and laying out for purchase, for example, at super markets. Any remaining water on the bulbs is apt to be a cause for decomposition. For this reason the troublesome peeling has been carved out by hand for domestic or home use.

Further, the bulb of an onion has a strong irritating ingredient which is generated when the onion skins are peeled. And this makes the peeling process uncomfortable.

The present invention provides a method of peeling the skins of a large quantity of onions without the use of human hands and without using a shower of water for peeling, cleaning and other processes.

The present invention further provides an onion skin peeling apparatus for carrying out the method.

BRIEF DESCRIPTION OF THE DRAWINGS

FIG. 4 is a schematic elevation showing an air blowing device according to this invention.

DESCRIPTION OF THE PREFERRED EMBODIMENT

Figure 1:
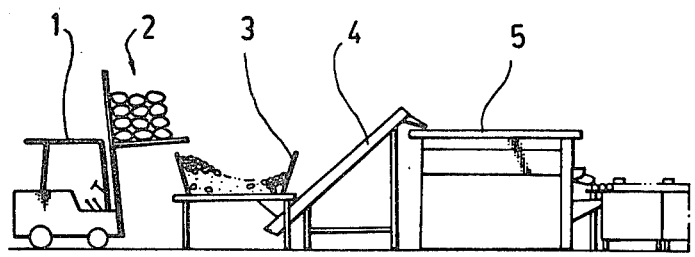
FIG. 1 is a schematic diagram of an onion peeling apparatus for practicing the method of this invention.

In FIG. 1, an onion skin peeling apparatus is shown. The peeling of onion skins off the onion bulbs is briefly explained with reference to the figure. The processes according to the invention are made on onion bulbs whose stalks are beforehand cut off.

Bags 2 each containing 2 Kg of onions are carried by a fork lift truck 1 and they are unpacked and supplied to a hopper 3. The onions are then continuously fed in a predetermined direction to a next treatment chamber 5 through a lift conveyor 4. They are fed flatwise into the treatment chamber 5 so that they do not pile up on each other. The onion skins of the onions are slit while being fed into the chamber 5 and become easily peelable. By the frictional impact between the onions, most of the slit skins are peeled away there. The surface of an outer scale within the onion skin may be slit likewise with the slitters, but since the thickness of the slitter edges is made only 3 mm, the outer scale is only injured linearly and slightly, thus avoiding peeling of the scale itself.

While the slitting process is done, compressed air is blown strongly toward the onions. The remaining onion skins are blown away from the bulbs by way of the air pressure. Dust on the bulbs is also removed by the compressed air.

Thus worked onions may be weighed and packed for shipping. If desired, the top and bottom of the bulbs may be cut before weighing. It will be noted, however, that these weighing, packing or cutting processes do not constitute the important part of the invention, but the essence of the invention is summarized as the slitting of the skins and the blowing of air onto the slit skins.

An embodiment of the treatment chamber 5 is explained in detail hereafter with reference to FIGS. 2, 3, 4 and 5.

In the treatment chamber 5, there is provided a chain conveyor for conveying onions supplied thereto flatwise. The chain conveyor comprises a pair of chains with a number of chain elements 51 and a number of metal plates 52 laid between the pair of chains. The chain conveyor is laid on chain sprockets (not shown) and is rotated in the direction of the arrow shown in FIG. 2.

The width of the chain conveyor is 40 cm and onions are transferred from the lift conveyor 4 (FIG. 1) within the central 30 cm portion of the chain conveyor. The onions are fed flatwise so as not to be piled upon each other.

The onions are then fed on the chain conveyor to a slitter line 53, which is driven by a motor, not shown, through a gear linkage, also not shown.

Figure 3C:
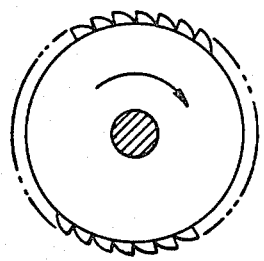
FIG. 3(A) is a plan view of an embodiment of a slitter according to the present invention, FIG. 3(B) a partially sectional view of the slitter, and FIG. 3(C) a transverse sectional view along the line A—A of FIG. 3(B)
Figure 3B:
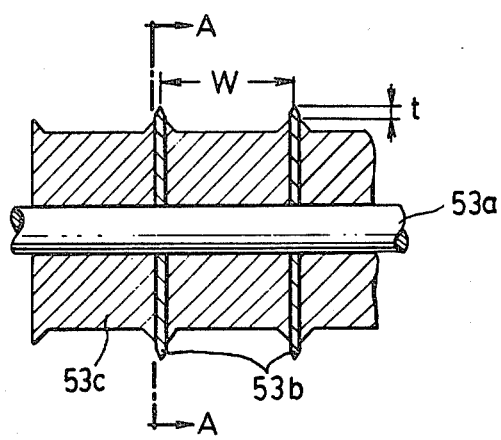
Figure 3A:
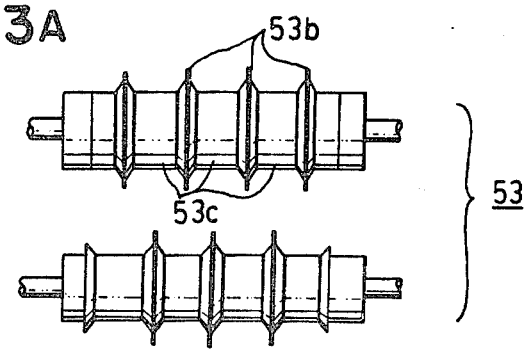

The slitter line 53 works as a roller conveyor which consists of rotatable cutters in the form of plural slitters 531, 532 . . . As shown in FIGS. 3(A), 3(B) and 3(C), each of the slitters 531, 532 . . . consists of a stainless shaft 53a rotatable about an axis extending in a direction transverse to the predetermined direction, plural cutters 53b of high speed steel in the form of circular saws provided around the shaft and plural plastic drums 53c, each of the cutters 53b being held between the neighboring drums 53c.

The diameter of the circular saw 53b is 6 cm and the height t of the cutter edge is 3 mm. The pitch W between two circular saws 53b is 3.2 cm. The neighboring slitters are disposed somewhat offset from each other as clearly shown in FIG. 3(A). The slitters are rotated usually at a speed of 600 r.p.m. but may be changed to four levels of speed up to 1,720 r.p.m.

Figure 2:
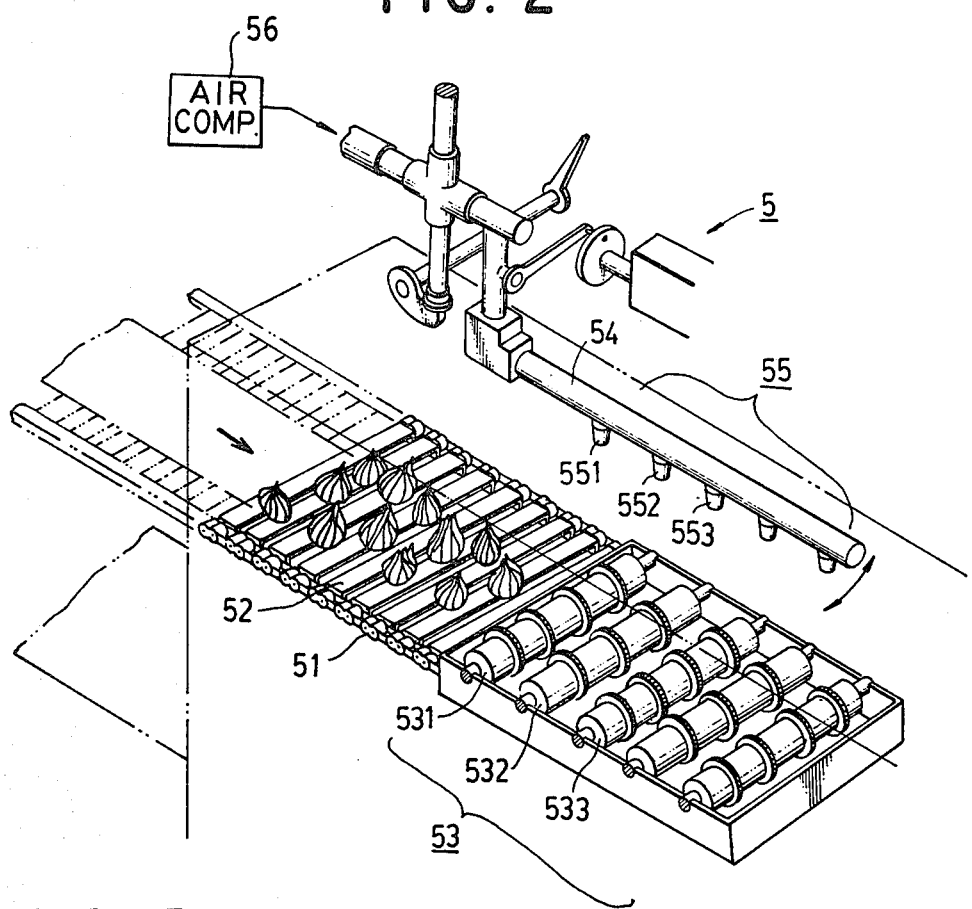
FIG. 2 is a perspective view showing an embodiment of a treating chamber in which slitting and air blowing processes are done.
Figure 5:
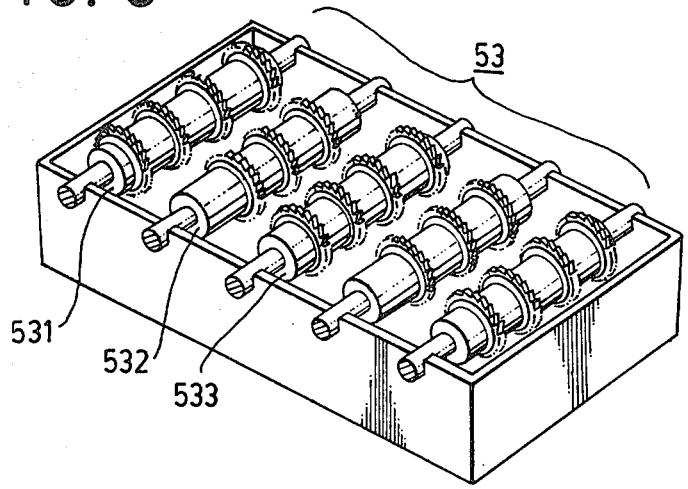
FIG. 5 is an enlarged perspective view of the slitter line showing the detailed structure thereof.

While the onions are slit at their surface skins in the slitter line, they are blown with compressed air from an air blowing device and the slit skins are completely removed there, an explanation of which is given hereafter with reference to FIGS. 2 and 4.

Above the slitter line 53, there is provided an air pipe 54. In series with the air pipe 54, an air nozzle line 55 is disposed, which is composed of air nozzles 551, 552 . . . Compressed air is supplied from an air compressor 56 to the air nozzle line 55 through the air pipe 54. The output of the air compressor 56 in this embodiment is 25 H.P. Compressed air at any delivery pressure of more than 8 Kg/cm$^2$, and a flow rate of more than 1,860 liters/min. is blown from the air nozzle line 55 with apertures of 2.2 mm, to shower the onions. The aperture of each air nozzle may be charged in the range between 1.8 mm and 3.2 mm. It is appropriate to set the distance between the onions on the slitter line 53 and the air nozzle line 55 in the range of 7.6 cm at the minimum and 12.6 cm at the maximum.

As shown in detail in FIG. 4, the air pipe 54 is swung around an axis 59 by a link mechanism 58 driven by a motor 57. The air pipe 54 reciprocates 143 times per minute, so that compressed air is blown up to the ends of shafts of the air nozzles 551, 552 . . . equally and sufficiently. The vertical level of the air pipe 54 may easily be varied by the vertical movement of a rod 62 through a cam 61 by the operation of a lever 60. In an air passage connecting the air pipe 54 and the air compressor 56, there is provided a flexible rubber pipe 63. With the existence of this rubber pipe 63, the air nozzle line 55 may be moved vertically according to the size of the bulb diameter and an adequate distance between the onions and the air nozzle line 55 may be chosen.

What is claimed is:

1. Apparatus for peeling onion skins from the bulbs of onions, comprising:
   (a) supply means for continuously providing a supply of onion bulbs;
   (b) conveyor means having an upper surface for transporting said onion bulbs in a predetermined direction from said supply means, said onion bulbs being carried on the upper surface of said conveyor means with a flatwise planar orientation so as to prevent piling of said onion bulbs on one another;
   (c) a roller conveyor, including a plurality of rotatable cutters for receiving onion bulbs from said conveyor means and slitting the skins thereof, said cutters being rotatable about axes extending in a direction transverse to said predetermined direction;
   (d) air nozzles coupled to a source of compressed air disposed just above said rotating cutters and extending to said predetermined direction along said roller conveyor, said air nozzles having discharge parts for blowing compressed air from said source downward onto the surfaces of said onion bulbs simultaneously with the slitting of the skins thereof by said rotatable cutters; and
   (e) means for swinging the discharge parts of said air nozzles so that said compressed air impinges on the width of said rotatable cutters.

2. Apparatus for peeling onion skins according to claim 1 wherein each of said rotatable cutters comprises a plurality of circular saws interposed between separating sections, the circular saws on adjacent rotatable cutters being offset from each other in the transverse direction.

3. Apparatus for peeling onion skins according to claim 1 wherein means are further provided for raising and lowering said air nozzles with respect to said rotatable cutters in a direction substantially perpendicular to said longitudinal and transverse directions.

* * * * *